United States Patent Office 3,793,289
Patented Feb. 19, 1974

3,793,289
FLAME RETARDANT NYLON COMPOSITIONS
Paul J. Koch, Mount Freedom, John B. O'Brien, Morris Plains, and Herman Stone and Marvin T. Tetenbaum, Convent, N.J., assignors to Allied Chemical Corporation, New York, N.Y.
No Drawing. Filed Oct. 13, 1971, Ser. No. 189,006
Int. Cl. C09k 3/28
U.S. Cl. 260—45.8 N             10 Claims

ABSTRACT OF THE DISCLOSURE

Certain substituted s-triazines, when added to polyamides in minor amounts, are effective flame retardant additives.

This invention relates to flame retardant polyamide compositions. More particularly, this invention relates to polyamides rendered flame retardant by the addition of certain substituted s-triazine compounds.

BACKGROUND OF THE INVENTION

With the recent increasing consciousness on the part of the public with respect to safety and consequent legislation requiring higher standards for goods of all kinds in commerce, increased activity on the part of researchers towards providing synthetic fibers, fabrics, and molded plastic products which are flame retardant has been generated. While additives that impart flame retardance to some polymers are known, their addition to polyamides, popularly known as nylons, has presented problems. Certain of these known additives degrade the physical properties of polyamides to such an extent that useful articles cannot be formed from them. Other known additives are required in such high amounts that desirable properties such as luster, hand, dyeability, and the like are greatly reduced. Thus there is a need for additives which will impart flame retardance to polyamides without a concomitant reduction of physical properties, and which are effective in small amounts such that commercially acceptable products are obtained.

SUMMARY OF THE INVENTION

It is an object of the present invention to provide flame retardant polyamide compositions.

It is another object to provide polyamide compositions which are flame retardant containing flame retardant additives in minor amounts.

Further objects will become apparent from the following detailed description thereof.

It has been discovered that compositions comprising a polyamide and certain substituted s-triazine compounds in minor amounts are flame retardant and retain the excellent physical properties of the polyamides.

DETAILED DESCRIPTION OF THE INVENTION

The substituted s-triazine compounds useful in the present invention have the formula

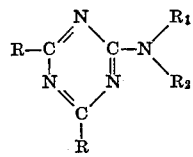

wherein $R_1$ and $R_2$ can be hydrogen,

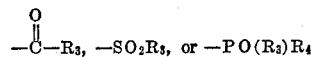

wherein $R_3$ and $R_4$ independently can be a hydrocarbon radical selected from the group consisting of alkyl, aryl, alkaryl, and aralkyl, preferably of 1 to 20 carbon atoms; or a halogen-substituted like hydrocarbon radical wherein the halogen is preferably chlorine or bromine; or wherein $R_1$ and $R_2$ together can form an imide ring of the formula

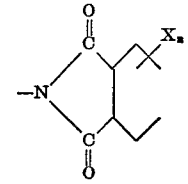

wherein the carbocyclic ring can be saturated, partially or completely unsaturated, or a polycyclic ring wherein all unsatisfied valences are satisfied with hydrogen; X can be alkyl, or halogen; $n$ is an integer of 0 to 10; and R at each occurrence independently can be

wherein $R_1$ and $R_2$ have the meanings given above; a hydrocarbon or halogen-substituted hydrocarbon radical wherein the hydrocarbon radical and halogen are defined as above with the proviso that when both R groups are —$NH_2$, both $R_1$ and $R_2$ cannot be hydrogen.

Illustrative of substituted s-triazine compounds useful in the present invention are mono-, di- and triacetyl melamine, tripropionyl melamine, diheptanoyl melamine, tribenzoyl melamine, and the like;

acetotquanamine,
benzoquanamine,
methyldiamino-1,3,5-triazine,
2,4,6-trichlorophenyl-1,3,5-triazine,
2,4-diamino-6-phenyl-1,3,5-triazine,
2,4-diamino-6-tolyl-s-triazine,
2,4-diamino-6-xylyl-s-triazine,
2,4-diamino-6-cyclohexyl-s-triazine,
2,4-diamino-6-(2,3,5,6-tetrabromophenyl)-s-triazine,
2,4-diamino-6-(4-methyltetrachlorophenyl)-s-triazine,
tri(2,3,4,5-tetrabromobenzamido)melamine,
(tetrabromophthalamido)melamine,
1-amino-3-methyl-5-phenyl-s-triazine,
tris(p-toluenesulfonyl)melamine,
tris(dimethylphosphoryl)melamine,
(endo-cis-bicyclo[2.2.1.]-5-heptene-1,4,5,6,7-hexachloro-2,3-dicarboximido)melamine, and the like.

Compounds especially preferred according to the invention have the formula

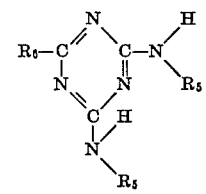

wherein $R_5$ is

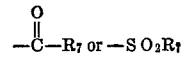

wherein $R_7$ is an alkyl or aralkyl group of 1 to 20 carbon atoms and $R_6$ can be —$NH_2$ or an —$NHR_5$ group.

The effective amount of substituted s-triazine compound required to be added to the polyamide is somewhat dependent upon the nature of the s-triazine and the polyamide. The minimum amount required may also be affected by the amount of fillers and the like present in the polyamide. A sufficient amount of s-triazine should be added to impart flame retardance to the polyamide, but an excess that will adversely affect the polyamide properties is to be avoided. The optimum amount for each combination of polyamide and substituted s-triazine compound, however, can be readily determined by one skilled in the art by a series of test runs. In general, from about 1 up to about 15%, preferably 2-8%, by weight of the total composition of the s-triazine additive is incorporated to impart flame retardancy to the polymers. The s-triazine additives can be pre-blended with the polymer particles, or can be added to the molten polyamide during extrusion, spinning operations and the like.

The polyamides useful in the invention can be any molding or fiber grade polyamide. The term polyamide is meant to include condensation polymers, such as polyhexamethyleneadipamide, polyhexamethylenesebacamide and the like; polymers of lactams having from 3 to 12 carbon atoms in the lactam ring, such as polycaprolactam, polycaprylolactam, polyoenantholactam, polylauryllactam, and the like; and copolymers of such lactams polymerized with, e.g., ethylene/alkyl acrylate, alkyl methacrylate and vinyl acetate copolymers. As is known to one skilled in the art such polyamides can also contain heat and light stabilizers, mold lubricants, terminating agents, nucleating agents, delusterants, pigments, fillers and the like in effective amounts.

The compositions of the invention are flame retardant, that is, they do not burn in air and are self-extinguishing in the absence of an active flame.

The invention will be further illustrated by the following examples, but it is to be understood that the invention is not meant to be limited to the descriptive details therein. In the examples, Limiting Oxygen Index, hhereinafter LOI, was determined on ½" x ⅛" x 5" compression molded specimens according to the technique outlined in ASTM Test D-2863.

The compositions of the invention were also tested according to a UL vertical burn test, whereby compression molded specimen 5" x ½" x ⅛" thick are clamped to hang vertically in air free from drafts. A blue Bunsen burner flame ¾" high is applied to the lower end of the sample for 10 seconds and removed. If flaming ceases within 25 seconds after removal of the test flame, the test flame is again placed under the specimen for 10 seconds immediately after flaming of the specimen ceases. The test flame is again withdrawn and the duration of flaming of the specimen is noted.

When flaming of the test specimen continues for 25 seconds or more after either the first or second ignition, it is rated as burning.

When flaming of the test specimen ceases within 25 seconds after either the first or second ignition, it is rated self-extingiushing (SE).

In the examples all parts and percentages are by weight.

Example 1

Pellets (388 parts) of a spinning grade polycaprolactam having a formic acid viscosity of 60 and containing 0.3% of titanium dioxide, 0.019% phosphoric acid and 0.038% manganese chloride, were blended with 12 parts (3%) of triacetyl melamine, dried for 16 hours at 75° C. in a vacuum oven and extruded at 255° C. as a monofilament. The product was pelletized, dried and compression molded.

LOI was 32.0. The composition was rated SE.

Examples 2–5

The general procedure of Example 1 was followed using various flame retardant additives. The results are summarized below:

| Example | Additive | Percent additive | LOI | Vertical burn Burning time, secs. 1st ignition | 2d ignition | Rating |
|---|---|---|---|---|---|---|
| Control | | | 24.5 | >25 | | Burns. |
| 2 | Triacetyl melamine | 1.5 | 28.0 | 0 | 4 | SE. |
| 3 | do | 4.3 | 38.5 | 0 | 3 | SE. |
| 4 | Diacetyl melamine | 2.6 | 32.4 | 0 | 3 | SE. |
| 5 | Tris(p-toluenesulfonyl)-melamine. | 7.0 | 30.5 | 0 | 4 | SE. |

Examples 6–8

The procedure of Example 1 was followed except 2% of various fillers were also added. The results are summarized below:

| Ex. | Filler | LOI | Vertical burn Burning time, secs. 1st ignition | 2d ignition | Rating |
|---|---|---|---|---|---|
| 6 | Chopped glass fibers | 28.0 | 0 | 4 | SE |
| 7 | Asbestos fibers | 32.4 | 0 | 1 | SE |
| 8 | Chopped nomex [1] | 30.8 | 0 | 1 | SE |

[1] An aromatic polyamide derived from isophthalic acid and m-phenylenediamine.

Examples 9–10

The procedure of Example 1 was followed except substituting a general purpose molding grade polyhexamethyleneadipamide for the polycaprolactam. The results are summarized below:

| Example: | Additive, percent | LOI | Vertical burn Burning time, secs. 1st ignition | 2d ignition | Rating |
|---|---|---|---|---|---|
| 9 | | 24.5 | 3 | >25 | Burns. |
| 10 | 3.0 | 34.5 | 0 | 1 | SE. |

We claim:

1. A flame retardant composition comprising a polyamide having recurring amide groups as integral parts of the main polymer chain and an effective amount of a substituted s-triazine compound of the formula

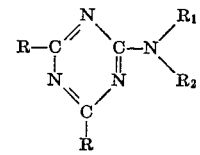

wherein $R_1$ and $R_2$ are selected from the group consisting of hydrogen,

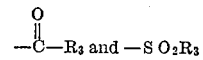

$R_3$ being a hydrocarbon radical or halogen-substituted hydrocarbon radical wherein said hydrocarbon radical is alkyl, aryl, alkaryl or aralkyl of 1 to 20 carbon atoms and said halogen is bromine or chlorine; and R is (a)

wherein $R_1$ and $R_2$ are as defined above, (b) a hydrocarbon radical or (c) a halogen-substituted hydrocarbon radical, wherein said hydrocarbon is alkyl, alkaryl or aralkyl of 1 to 20 carbon atoms and said halogen is bromine or chlorine, with the proviso that when both R groups are —NH$_2$, both R$_1$ and R$_2$ cannot be hydrogen.

2. A composition according to claim 1 containing from 1 to 15% by weight based on the total composition of the s-triazine compound.

3. A flame retardant composition comprising a polyamide having recurring amide groups as integral parts of the main polymer chain and an effective amount of a substituted s-triazine of the formula

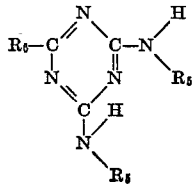

wherein R$_5$ is

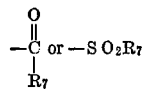

wherein R$_7$ is an alkyl or aralkyl group of 1 to 20 carbon atoms and R$_6$ is —NH$_2$ or —NHR$_5$ wherein R$_5$ has the aforesaid meaning.

4. A composition according to claim 3 wherein R$_5$ is

5. A composition according to claim 3 wherein the substituted s-triazine is diacetyl melamine.

6. A composition according to claim 3 wherein the substituted s-triazine is triacetyl melamine.

7. A composition according to claim 3 wherein R$_5$ is —SO$_2$R$_7$.

8. A composition according to claim 7 wherein the substituted s-triazine is tris(p-toluenesulfonyl)melamine.

9. A composition according to claim 1 wherein the polyamide is polycaprolactam.

10. A composition according to claim 1 wherein the polyamide is polyhexamethyleneadipamide.

References Cited

UNITED STATES PATENTS

| | | | |
|---|---|---|---|
| 2,544,071 | 3/1951 | Dudley | 260—249.6 |
| 2,634,270 | 4/1953 | Nielsen | 260—249.8 |
| 3,296,265 | 1/1967 | Garner | 260—249.6 |
| 3,520,974 | 7/1970 | Hamm | 424—249 |
| 3,551,360 | 12/1970 | Dressler | 260—2.5 |
| 3,590,042 | 6/1971 | Cyba | 260—249.6 |
| 3,629,467 | 12/1971 | Bossinger et al. | 424—249 |
| 3,660,344 | 5/1972 | Michael et al. | 260—37 |
| 2,739,977 | 3/1956 | Gamrath et al. | 260—960 |

OTHER REFERENCES

Kurzer et al., Chemical Abstracts, vol. 48, 3371 c, 1954.

HOSEA E. TAYLOR, Primary Examiner

R. A. WHITE, Assistant Examiner

U.S. Cl. X.R.

260—37 N, 857 TW